Patented Sept. 28, 1937

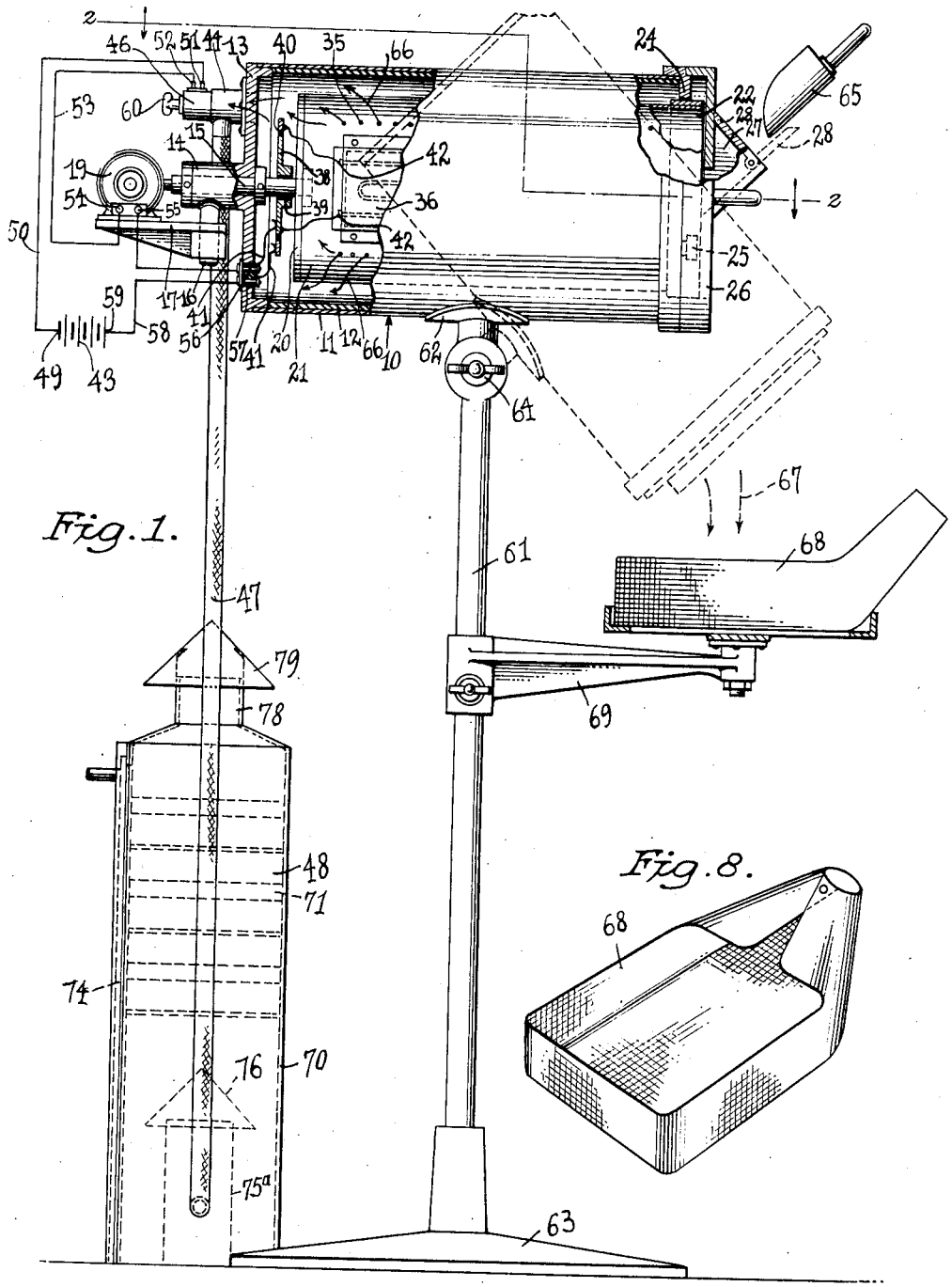

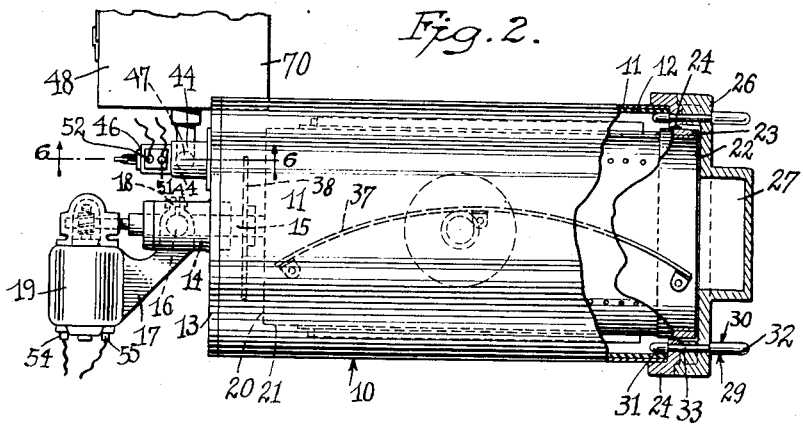

2,094,016

UNITED STATES PATENT OFFICE 2,094,016

PORTABLE COFFEE ROASTER

Joseph Lampel, New York, N. Y.

Application April 28, 1934, Serial No. 722,875

5 Claims. (Cl. 34—5)

This invention relates to devices and mechanisms for roasting coffee and has for its main object to provide a novel device of this type which will be easy to install in any store where they sell coffee so that coffee may be roasted right then and there in amounts and at any time desired, these objects preferably being attained by making the device portable.

Another object of this invention is to provide a coffee roaster of the character mentioned which will be simple in construction, easy to install and operate and which will be efficient in its workings.

Still a further object of this invention is to provide a simple portable coffee roaster which may be heated and operated electrically to attain the object recited hereinbefore.

A further object of this invention is to provide a coffee roaster, as characterized hereinbefore, which will not permit the fumes and smoke accompanying the roasting of coffee to enter the premises in which the roasting is done, or they will permit only the perfume or odor of the coffee to escape thereinto, which is rather desired.

Other objects of this invention will be apparent as the specification of the same proceeds.

In the drawings accompanying this specification and being made a part thereof:

Fig. 1 is a partly sectional elevation of my device, the electrical circuit operating the same being shown in a diagrammatic manner;

Fig. 2 is a partly sectional plan view of the main portion of my device, the rest of the same being broken away;

Fig. 3 is a front end elevation of the roaster proper, the cover thereof having been removed;

Fig. 4 is a cross section of my rotating coffee roasting cylinder;

Fig. 5 is an elevational view of the cover of my device, seen from the inside thereof;

Fig. 6 is a partly sectional elevation of a fan or an exhaust device used in connection with my coffee roasting machine, while Fig. 7 is a partly sectional elevation of a smoke and fume consuming chemical device, and Fig. 8 is a perspective view of a preferred form for a basket to receive the roasted coffee.

Referring now to the drawings more closely, by characters of reference, the numeral 10 indicates the main portion or roaster proper of my device in general, the same being housed in a sheet metal cylinder 11 having a heat insulating lining 12 and an inner cover or supporting disc 13 on which the left hand end thereof is secured, as shown.

Disc 13 is continued in a hub portion 14 in which shaft 15 is rotatably journalled. The hub or bearing 14 has a downward extension 16 to which is secured a platform bracket 17 as by the resilient screw operated arms 18, indicated in Fig. 2 by dotted lines. On the bracket 17 I arrange an electric motor 19 of any suitable design, by which the shaft 15 may be rotated, as will be obvious by inspecting the drawings.

On the inner end of shaft 15 a disc or cover 20 is secured, rotatable therewith, and carrying the inner sheet metal cylinder 21 which, therefore, will be rotated with the shaft 15. The outer end 22 of the cylinder 21 may be reinforced by the ring 23 said ring being slidable by closely fitting into the opening of an inner cover flange 24 of the outer cylinder 11. Rollers 25 may be applied on the flange 24, as shown, on which rollers the inner cylinder 21 may rotatably rest. An outer cover disc 26 may be secured on the flange 24 having a feeding and discharge opening or chute 27 provided in the upper part of the center thereof, the opening of said chute normally being closed by a pivoted cover 28, as will be obvious.

Cover 26 is removably secured on flange 24 by the so-called bayonet locks 29, best shown in Figs. 2 and 3. Said bayonet locks comprise two pins 30 permanently secured into the cover 26 and inwardly projecting therefrom through the body thereof and also of the flange 24 and terminating at the inside of flange 24 in enlarged heads 31, the outer end 32 of said pins is also enlarged and provides the grip members for locking or releasing and removing said cover 26, while the middle portions 33 thereof is of somewhat smaller diameter than head 31. Two oppositely placed slots 29 are provided in the flange 24 having an elongated narrower portion 29a and reversely placed circular apertures 29b. The head 31 of the locking pin 30 may pass through the apertures 29b, but cannot be withdrawn through the narrower portions 29a of the bayonet slots 29, so that when it is desired to lock the cover 26 on the flange 24, heads 31 of the pins will be passed through the apertures 29b, then a clockwise rocking motion given to the cover 26, as indicated by the arrow 34 in Fig. 3, whereupon the middle portions 33 of said pins will ride into the narrow slots 29a and the cover will be prevented from freeing itself of the flange 24. In case it is desired to remove the cover 26 a reverse operation to that just described will be executed and then the heads 31 of the pins pulled out of engagement with the flange 24 through the apertures 29b. Four or, if necessary, more rows of small holes 35 are provided in the cylinder 21 and electric heating units 36 of any appropriate design are applied to the outer surface thereof, while a stirrer 37 may be arranged in the inside of same. Shaft 15 further may carry a disc 38, rotatable therewith, and, of course, with the inner cylinder 21, said disc being of electroconductive material but being insulated from the shaft 15, as at 39, while the outer and inner portions of said disc are further insulated from one another, as at 40. Two stationary resilient electrical brushes 41 are further secured into the inner cover 13 of the stationary outer cylinder 11, said brushes being insulated from the material of said cover and from one another and receiving the two terminals of an electrical circuit, the two terminals 42 of the heating units being electrically connected to the outer and inner portions of said disc 40, respectively, and thereby said electrical heating units are connected into the electrical circuit shown in Fig. 1 fed by the source of current 43, as will be obvious to those versed in this art. To the upper left hand portion of cover 13 of the outer cylinder 11 is further secured a fan or exhaust device 44 of any appropriate design which will communicate with the inside of said cylinder through the opening 45 (Fig. 6) and which may independently be driven by its own small motor device 46, as it is well known in the art. The fan or exhaust device is continued in a tube 47, said tube preferably being flexible and entering a preferably rectangular fume and smoke consuming device 48, the construction and operation of which will be described more in detail hereinafter.

The preferred arrangement of the electrical circuit, operating and feeding of the various devices hereinbefore described, is shown in Fig. 1, and, as indicated therein, the current leaves the positive pole 49 of the source of current 43, then passes through the branch 50 into the exhauster 44, as at 51, leaving the same, as at 52, then passing through the branch 53 into the motor 19, as at 54, leaving the motor, as at 55, and then entering the electrical heating units through one of the resilient brushes 41, as at 56, leaving the same, as at 57, and returning through the branch 58 to the negative pole 59 of the source of current 53. A common switch device 60 may be arranged for all these various devices, here shown as applied on the exhauster 44.

Cylinder 11 may be permanently secured on a standard or pole 61, as at 62, said pole resting on a base 63 and having a releasable pivoted joint 64 inserted therein adjacent to the cylinder 11.

The use and operation of my device is as follows:

When it is desired to roast coffee therein, the cover 26 will be opened, as shown by its dotted position in Fig. 1, and the coffee charged into the inner rotating cylinder 21, as by the scooper 65, indicated in said figure, thereupon the cover 26 will be closed and the electrical circuit closed by the switch 60 whereupon the electric motor 19 will rotate the cylinder 21 through the shaft 15 and being supported at its outer end by the roller 25. At the same time heating units 36 will give the necessary high temperature, as regulated, to the coffee in the cylinder 21 and the resulting fumes, gases and smoke as well as the small particles or chaff usually given off in roasting the coffee will pass from cylinder 21 through the holes 35, as is indicated by the arrows 66, into the exhauster 44 and then through the flexible pipe or hose 47 into the chemical absorbing device 48. In my device, the coffee will be roasted in a very short time, when the electrical circuit will be broken, cover 26 removed by the method described hereinbefore and the flexible hose 47 disconnected from exhauster 44 when the device may be tilted through the loosening of the pivot joint 64 into the dotted position shown in Fig. 1 and the roasted coffee dropped therefrom, as indicated by the arrows 67, into a receiving basket 68, preferably resting on a bracket 69 secured on supporting post 61.

The outer cylinder 11 and its associated parts may then be returned into the full line horizontal position thereof, cover 26 replaced and locked thereon through the bayonet lock described, hose 47 connected, and the device is ready for another roasting operation.

Stirrer 37 is employed in the inside of the rotating roasting cylinder 21 in order to steadily stir and mix the coffee while it is being roasted.

The chemical absorbing device for the fumes, gases, and the like is constructed and operates as follows:

In an outer preferably rectangular upstanding box or housing 70 several shelves 71 may be employed on which are slidably and removably arranged baskets 72 containing a layer of material 73 preferably constructed and treated in the manner to be described presently.

Said layer 73 in the preferred form of my invention is composed of appropriate layers of absorbent cotton, wood shavings, and the like, and said materials will be impregnated with a water solution of calcium phosphite and also sodium borate. The preferred proportion of this treating or impregnating composition is eight weight units of calcium phosphite and two units of sodium borate dissolved in sixty weight units of water.

An upwardly slidable door 74 may occupy the major part of one side of the box or housing 70 and when it is desired to get access to the inside thereof or to remove the materials therein said door 74 is removed, baskets 72 with the treated layers of material therein will be pulled out sliding on the shelf 71 and their charge renewed.

The fumes, gases, chaff, smoke, and the like removed by the exhauster 44, as indicated by the arrow 75, will pass downwardly through the hose 47 into the absorbing device 48 and therein they first enter into an upstanding pipe $75^a$ having a funnel 76 thereon with wide openings between the top portion of the pipe $75^a$ and the inside of funnel 76. The gases will now follow the path indicated by the arrows 77, escaping from underneath the funnel 76 and passing through the impregnated layers of material 73, finally arriving into an upper pipe 78 covered by a discharge funnel 79 from underneath of which the final remaining hot air, traces of gas, and perfumes and odors will pass into the atmosphere, as indicated by the arrow 80.

The chaff and other small solid particles will be deposited around the lower pipe $75^a$ at the bottom of the device through impinging on the funnel 76. It will be seen that my device provides a very efficient, simple, portable, quickly operated coffee roaster, the use and operation of which will be without any unpleasant accompanying effects and very clean, while, at the same time, the same may be easily set up in any store or other premises and simply switched into any existing electrical circuit.

It is understood that my device may be used for roasting other materials which may be treated like coffee, as, for instance, peanuts.

It will be seen that my invention provides a portable instant roasting apparatus for preparing coffee in the green bean state for grinding in the presence of customers, and for assuring the freshness and quality of the roasted coffee to the customer. With my device means are provided whereby a small amount of green coffee beans of a determined or selected grade may be quickly roasted right in the store selling the same and said roasted beans delivered to an appropriate dispenser and then to a grinder, all in the presence of the customer and within a very short period of time so that an absolutely freshly roasted coffee may be ready to be used in the percolator or other devices for preparing the coffee in any of the usual manners.

It also will be seen that my device provides means for gathering and storing or arresting the obnoxious fumes and gaseous vapors generated by the roasting process and permitting only the fragrant or inviting odors to disseminate throughout the room in which my apparatus is operated, thus distinguishing, by the sense of smell, the grade of coffee under treatment and avoiding substitution of an inferior quality of coffee for that desired or requested.

It will be understood that changes and variations may be made in the parts and combinations of my device and I hereby reserve all my rights to any and all such changes as are within the spirit of the invention and the scope of the appended claims.

What I claim as new is:

1. A coffee roaster comprising in combination an outer non-rotatable insulated drum; a closure disk secured to one of its ends; primary and secondary motors supported by said disk; an inner perforated coffee roasting drum having an open end and means for rotating it from the primary motor; a fan operated by the secondary motor on said disk; an inwardly directed annular flange on said outer drum encircling and slightly spaced from the said inner drum; anti-friction rollers fixedly supported on said flange and bearing on the said inner drum at equi-distant opposite points of the vertical centers of said drums for supporting the free end of the inner drum centrally with the outer drum; a cover plate outside of said rollers and the open end of the inner drum; means for supplying heat to the inner drum and for operating said motors, and a forwardly curved baffle within the inner cylinder.

2. A coffee roaster comprising, in combination, a normally fixed outer insulated drum supported centrally of its length in a horizontal position; a disk for closing one end of said drum; primary and secondary motors supported by said disk; an inner rotary drum driven by the primary motor; an exhaust fan driven by the secondary motor; a closure plate on one end of the rotary drum and a reinforcing ring on its opposite end; a ring on the open end of the outer drum and formed with an annular shoulder and an inwardly directed annular flange encircling and slightly spaced from the said reinforcing ring; anti-friction rollers fixedly supported on said flange and bearing on the said reinforcing ring at equi-distant opposite points of the vertical centers of said drums; a cover plate engaging the said shoulders; means operable by imparting a short turning movement of the cover plate on said shoulder for locking said cover plate in place, and means supplying heat and for driving the motors.

3. A coffee roaster comprising, in combination, a stationary drum; a disk for closing one end and a shouldered ring having an annular flange partly closing the opposite end thereof; primary and secondary motors supported on said closure disk; an inner perforated rotary drum connected to the primary motor; a closure for one end of the inner drum and a ring encircling the opposite end; a fan connected to the secondary motor; rollers located below the horizontal center of the inner drum and equi-distant from its vertical center and bearing on said ring; a cover plate having a charging door and engaging the shoulder of said shouldered ring to form a step joint therewith; interlocking devices for securing the cover plate, and means for heating the inner drum and for operating the motors.

4. A coffee roaster comprising a centrally supported cylinder; a cast metal cover fixed to one end thereof and formed with a central integral bearing and a unitary bar pending therefrom; a universally adjustable support clamped to said bar; a perforated inner cylinder having a closure plate at one end; a primary motor on said support; a shaft locked to the said closure plate and extending outwardly through the bearing to said motor; said cast metal cover having an exhaust hole therein; a secondary motor fixed on said cover in alinement with the exhaust hole; exhausting means on the shaft of the secondary motor; a stiffening ring encircling the open end of the inner cylinder; a flanged ring on the open end of the outer cylinder, a cover plate common to both cylinders; locking means extending through the closure plate and the flange of said flanged ring operable by imparting to said cover a short turn around its center, and anti-friction supports one at either side of the inner cylinder and engaging the said stiffening ring.

5. A portable coffee roaster comprising a centrally supported balanced cylinder; a two piece leg for normally maintaining the cylinder at the horizontal, a relatively heavy floor plate at the bottom of the leg and unattached with respect to the floor to prevent tilting of the leg; a projective support on said leg and a receptacle thereon for receiving roasted coffee; a clamping joint between the leg pieces for adjusting the upper leg piece at a dumping angle to the vertical; a rotary cylinder centrally mounted within said cylinder and permanently closed at one end; means for driving the drum from this end; a ring fixed to the opposite open end providing a track; anti-friction rollers contacting said track below the central horizontal line thereof and equi-distant from its vertical center; a closure plate having a charging opening and a protective hood over said opening.

JOSEPH LAMPEL.